United States Patent
Artman et al.

(10) Patent No.: US 10,237,928 B2
(45) Date of Patent: Mar. 19, 2019

(54) LONG LENGTH ELECTRODES

(75) Inventors: Diane M. Artman, Westlake, OH (US); Philip Dennis Coleman, Avon, OH (US); Juan Morales, Medina, OH (US)

(73) Assignee: GrafTech International Holdings Inc., Brooklyn Heights, OH (US)

(*) Notice: Subject to any disclaimer, the term of this patent is extended or adjusted under 35 U.S.C. 154(b) by 1097 days.

(21) Appl. No.: 12/062,005

(22) Filed: Apr. 3, 2008

(65) Prior Publication Data

US 2008/0247440 A1    Oct. 9, 2008

Related U.S. Application Data

(60) Provisional application No. 60/922,519, filed on Apr. 9, 2007.

(51) Int. Cl.
| | | |
|---|---|---|
| *H05B 7/06* | (2006.01) | |
| *H05B 7/085* | (2006.01) | |
| *H05B 7/14* | (2006.01) | |

(52) U.S. Cl.
CPC .............. *H05B 7/06* (2013.01); *H05B 7/085* (2013.01); *H05B 7/14* (2013.01); *Y02P 10/256* (2015.11); *Y02P 10/259* (2015.11)

(58) Field of Classification Search
CPC .. H05B 7/085; H05B 7/06; H05B 7/14; Y02P 10/256; Y02P 10/259
USPC ................................................... 373/88–108
See application file for complete search history.

(56) References Cited

U.S. PATENT DOCUMENTS

| | | | | |
|---|---|---|---|---|
| RE18,062 E | * | 5/1931 | Doerschuk | 252/510 |
| 2,728,018 A | * | 12/1955 | Moore | 314/62 |
| 3,569,609 A | * | 3/1971 | Fowler | H05B 7/14 373/92 |
| 3,771,889 A | * | 11/1973 | Whitwell et al. | 373/92 |
| 4,290,709 A | * | 9/1981 | Seldin et al. | 373/92 |
| 4,446,561 A | | 5/1984 | Zollner et al. | |
| 5,479,433 A | * | 12/1995 | Maki et al. | 373/72 |
| 6,167,076 A | * | 12/2000 | Ignacio | 373/92 |
| 6,925,104 B2 | * | 8/2005 | Baumann et al. | 373/92 |

(Continued)

FOREIGN PATENT DOCUMENTS

| | | | |
|---|---|---|---|
| EP | 1406473 A | 4/2004 | |
| EP | 1528840 A | 5/2005 | |

(Continued)

OTHER PUBLICATIONS

National Electrical Manufacturers Association, NEMA Standards Publication CG 1-2001, Manufactured Graphite/Carbon Electrodes (2002).

(Continued)

*Primary Examiner* — Hung D Nguyen

(57) ABSTRACT

An embodiment disclosed herein includes a monolithic graphite electrode. The electrode has a main body having a length of more than 3050 mm. Another embodiment disclosed herein includes an electrode column comprising a plurality of monolithic graphite electrodes. The column has a length of more than 3050 mm of electrode per joint. A further embodiment discussed herein is the practice of increasing the length of the electrode to minimize the occurrence of an electrode joint in the electrode column for a given length. This practice will improve efficiencies for both electrode manufacturers as well as electric arc furnace operators.

11 Claims, 2 Drawing Sheets

(56) References Cited

U.S. PATENT DOCUMENTS

| | | | |
|---|---|---|---|
| 7,016,394 B2 | 3/2006 | Smith | |
| 2005/0249260 A1* | 11/2005 | Smith | 373/88 |
| 2006/0140244 A1* | 6/2006 | Artman | 373/93 |
| 2006/0291525 A1* | 12/2006 | Montminy | F16B 33/006 373/92 |
| 2007/0082312 A1* | 4/2007 | Eichberger | C21C 5/527 432/78 |

FOREIGN PATENT DOCUMENTS

| | | |
|---|---|---|
| JP | 10321364 | 12/1998 |
| SU | 415837 A | 2/1974 |
| SU | 1056480 A | 11/1983 |
| WO | WO2005120762 A | 12/2005 |
| WO | 2006071366 A2 | 7/2006 |

OTHER PUBLICATIONS

International Electrotechnical Commission (IEC), published in the International Standard, Third Edition, May 1997 (1997).

Japanese Standard Association (JSA) and published in Japanese Industrial Standard JIS R 7201: 1997, Cylindrical Machined Graphite Electrodes (1998).

Rick Adams et al. "Graphite Electrode and Needle Coke Development", 2007, http://acs.omnibooksonline.com/data/papers/2007_D031(K).pdf.

SGL Group, Super Long Electrode Advertisement, http://www.sglgroup.com/cms/international/products/product-groups/gce/graphite-electrodes/index.html?_locale=en.

* cited by examiner

LONG LENGTH ELECTRODES

BACKGROUND OF THE INVENTION

Technical Field

The present invention relates to graphite articles, and a process for preparing the graphite articles. More particularly, the invention concerns articles such as graphite electrodes.

Background Art

Graphite electrodes are used in the steel industry to melt the metals and other ingredients used to form steel in electrothermal furnaces. The heat needed to melt metals is generated by passing current through a plurality of electrodes, usually three, and forming an arc between the electrodes and the metal. Electrical currents in excess of 50,000 amperes are often used. The resulting high temperature melts the metals and other ingredients. Generally, the electrodes used in steel furnaces each consist of electrode columns, that is, a series of individual electrodes joined to form a single column. In this way, as electrodes are depleted during the thermal process, replacement electrodes can be joined to the column to maintain the length of the column extending into the furnace.

Generally, electrodes are joined into columns via a pin (sometimes referred to as a nipple) that functions to join the ends of adjoining electrodes. Typically, the pin takes the form of opposed male threaded sections, with at least one end of the electrodes comprising female threaded sections capable of mating with the male threaded section of the pin. Thus, when each of the opposing male threaded sections of a pin are threaded into female threaded sections in the ends of two electrodes, those electrodes become joined into an electrode column. Commonly, the joined ends of the adjoining electrodes and the pin there between, is referred to in the art as a pin joint.

Given the extreme thermal stress that the electrode and the joint (and indeed the electrode column as a whole) undergoes, mechanical/thermal factors such as strength, thermal expansion, and crack resistance must be carefully balanced to avoid damage or destruction of the electrode column or individual electrodes. For instance, longitudinal (i.e., along the length of the electrode/electrode column) thermal expansion of the electrodes, especially at a rate different than that of the pin, can force the joint apart, reducing effectiveness of the electrode column in conducting the electrical current. Typically, the across grain coefficient of thermal expansion (CTE) of the pin is higher than the across the grain CTE of the electrode. Therefore transverse (i.e., across the diameter of the electrode/electrode column) thermal expansion of the pin being somewhat greater than that of the electrode may be used to form a firm connection between pin and electrode; however, if the transverse thermal expansion of the pin greatly exceeds that of the electrode, damage to the electrode or separation of the joint may result. Again, this can result in reduced effectiveness of the electrode column or even destruction of the column if the damage is so severe that the electrode column fails at the joint section.

As a consequence of the above, the pin joint is a point of concern in an electrode column. To improve the reliability of pin joints, pins are often made from graphite of higher density and strength than the electrode itself. However, increasing the strength and density of graphite pins also increases the manufacturing time and cost of the pin, and hence the cost of the electrode column formed using pin joints. There have been other efforts to improve the reliability of the pin joint. For example, an electrode pin joint may include a reservoir to hold a quantity of pitch binder as a curable binder. While on the furnace, the pitch will reach its softening point and will flow between the threads. Upon more intense heating, the pitch will carbonize in between the threads and hold the adjacent threads together. Variations on this concept include the pin having one or more flow channels and/or the pin joint including more than one pitch reservoir or the location of the reservoir being varied.

In the past, efforts have also been taken to eliminate the pin from the joint in order to improve the performance of the electrode column system. Prior attempts to eliminate the pin, which have been attempted, include a threaded electrode end or other electrode mating means being employed. For example electrodes have been made which include an integral threaded tang at one end of the electrode, also known as a pinless joint. Industry acceptance of a pinless joint has lagged, however, since the strength of the graphite in the electrode is viewed by some as not sufficient to maintain the integrity of the electrode column. For the above reasons and others, the joint between two adjacent electrodes in an electrode column is an area of concern for an operator of an electric arc furnace.

A Soderberg Paste electrode is an example of a prior attempt to produce a pinless electrode. The Soderberg electrode is a continuously formed electrode used in an electric arc furnace, in which a mixture of petroleum coke and coal-tar pitch is continuously added to a steel casing and is baked as it passes through the heated casing, such that the baked electrode emerging into the furnace continuously replaces the electrode being consumed. Since these electrodes are baked and not graphitized, their performance is not suitable for use in electric arc steelmaking. The paste electrodes are typically used in arc furnaces for manufacturing ferroalloys, aluminum, nickel, copper and other non-ferrous applications.

In light of the above issues, electrode joint designs have been standardized over the years. These standards specify the height and diameter designs for pins along with the parameters for the threads of the socket of an electrode. In addition to standards regarding the electrode joint, standards have also been drafted and approved regarding the length and diameter of the electrode. Examples of one such standard are IEC 60239 and JIS R7201. In each one of these standards the length of the electrode varies from no more than 2900 mm to about 825 mm and the diameter of the electrode may vary from between 765 mm to 352 mm for an electrode of 2900 mm to 2275 mm in length.

Another issue for a steel manufacturer is downtime and other problems associated with electrode additions to the arc furnace. Each time another electrode is to be added to an electrode column or a new column is to be added to the furnace, the furnace must be shut down while the electrode or electrode column is added. Typically, for a furnace where three electrode columns are in simultaneous operation, the equivalent of one electrode will be consumed over the course of about one eight (8) hour shift. Thus, to add an electrode to a column, or to exchange a shortened column with one of longer length, the furnace must be shut down about three times during every twenty-four (24) hour period.

An example of how electrode columns are installed on a furnace is illustrated in FIGS. 3 and 4. FIG. 3 is a top view of the electric arc furnace depicted in FIG. 4. As illustrated, the three electrode columns 104, 120, and 130 are installed in furnace 102. Typically a furnace operated on alternating electric current will have three such columns, where a furnace operating on direct electrical current will use larger diameter electrodes in a single electrode column.

When a particular electrode column is consumed, typically the electrical current to create the arc to reclaim the steel is turned off and the remainder of the consumed column is removed from the furnace. The power is then turned on and the current is transmitted through one or more of the remaining electrode columns and/or replacement column. Depicted in FIG. 4 is a view of electrical arc furnace 102 which shows two (2) electrode columns 104 and 120. Column 104 includes three (3) electrodes 106, 108, and 110. The joints between the electrodes of column 104 are represented as reference numerals 112 and 114.

Electrode column 120 includes two electrodes 122 and 124. In the depicted example, an electrode, such as electrode 110 may be added to electrode column 104 by the use of an electrode robot 126. As shown robot 126 is used to add a third electrode to a column already comprising more than one electrode. Robot 126 may be used to align and rotate the electrode being added to the column to engage a threaded portion of the top joint element of the electrode directly below the electrode being added. Robot 126 may travel along rails 128, shown in FIG. 4 or may be positioned over the column by the use of an overhead crane.

Similar to what was previously discussed, when an electrode is being added to a column, the electrical current being passed through a column of the electrodes in furnace 102 is turned off and the significant production time is lost due to this change.

One method of reducing electrode additions at the furnace is to join two relatively shorter electrodes together prior to delivery to the steelmaker, as described in published U.S. patent application 2006/0140244. However, this approach has the disadvantage that each of the shorter electrodes must be machined to have its own threaded tang and socket portions prior to assembly, requiring the machining of four threaded sections instead of two for a single electrode. The need to machine four threaded sections requires additional labor and time, and wastes the high value graphite material that is machined away to make the threaded section. Thus, there is a need for a monolithic electrode, that is, an electrode without an added joint that can also provide the user with a longer period of productivity between electrode additions.

BRIEF DESCRIPTION

The present invention seeks to provide a monolithic graphite electrode having advantages over known such electrodes.

According to the present invention there is provided a monolithic graphite electrode comprising a main body having a length of more than 3050 mm.

Advantageously, the electrode of the present invention overcomes problems with standard type electrodes such as furnace downtime.

Preferably, the electrode main body includes a pair of end faces, each face includes a socket.

Preferably, the length of the main body comprises more than 3330 mm. Preferably still, the length of the main body comprises more than 3430 mm. More preferably, the length of the main body comprises more than 3680 mm.

Preferably, a diameter of the electrode comprises from about 500 mm to about 900 mm. More preferably, the diameter of the electrode comprises from about 500 mm to 860 mm, even more preferably no more than 850 mm.

Preferably, in one embodiment, the threads per inch ("TPI") of the tang comprises less then four (4), e.g., three (3) or two (2) and a TPI of the socket comprises two. Preferably a taper of the tang comprises 9° or greater.

Another embodiment disclosed herein includes an electrode column comprising a plurality of monolithic graphite electrodes. The column has a length of more than 3050 mm of electrode per joint and more preferably 3300 mm or more per electrode joint.

Preferably, the column has an overall length of at least 6350 mm and less than two joints.

A further embodiment discussed herein is the practice of increasing the length of the electrode to minimize the occurrence of an electrode joint in the electrode column for a given length. This practice will improve efficiencies for both electrode manufacturers as well as electric arc furnace operators.

BRIEF DESCRIPTION OF THE DRAWINGS

The present invention will now be described in more detail, by way of example only with reference to the accompanying drawings, in which.

DETAILED DESCRIPTION

Figure 1:
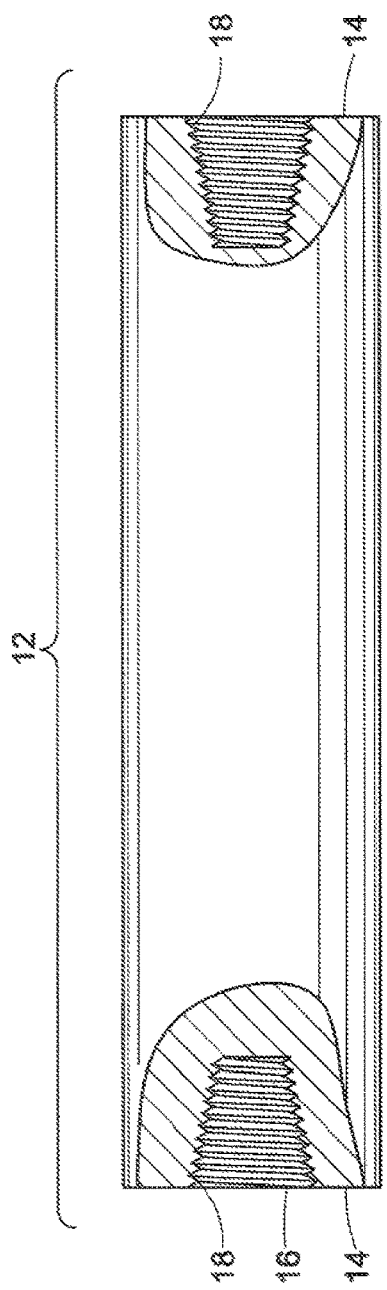
FIG. 1 is a view of a pin-socket electrode.

As noted above, graphite articles (graphite articles is used herein to include at least graphite electrodes) could be fabricated by first combining a particulate fraction comprising calcined coke (when the graphite article to be produced is graphite electrode), pitch and mesosphere pitch or PAN-based carbon fibers into a stock blend. More specifically, crushed, sized and milled calcined petroleum coke is mixed with a coal-tar pitch binder to form the blend. The particle size of the calcined coke is selected according to the end use of the article, and is within the skill in the art. Generally, in graphite electrodes for use in processing steel, particles up to about 25 millimeters (mm) in average diameter are employed in the blend. The particulate fraction preferably includes a small particle size filler comprising coke powder. Other additives that may be incorporated into the small particle size filler include iron oxides to inhibit puffing (caused by release of sulfur from its bond with carbon inside the coke particles), coke powder and oils or other lubricants to facilitate extrusion of the blend.

The blend may also include mesophase pitch-based carbon fibers or fibers derived from PAN (polyacrylonitrile), added after mixing of the stock has already begun. The fibers used should advantageously have a Young's modulus (after carbonization) of about 100 GPa to about 275 GPa or higher (Cytec's Thornel T-300 PAN fibers have a tensile modulus of 231 GPa http://www.cytec.com/business/engineeredmaterials/CFInternet/cfThornelT-300PAN.shtm). The fibers preferably have an average diameter of about 6 to about 15 microns (T-300 is 7 micron), a tensile strength of about 1.4 GPa to about 2.8 GPa. In certain embodiments, the tensile strength of the fibers may be as high as up to 5 GPa, (The tensile strength of T-300 is 3.75 GPa). Preferably the length of the fibers is about 4 mm to about 32 mm in length on average. Suitable lengths of fiber include an average length of about 6 mm or less, about 12 mm or less, about 18 mm or less, or about 25 mm or less. It is also preferred that the carbon fibers are not longer than the biggest coke particle.

Most advantageously, the fibers are added to the blend as bundles containing between about 2000 and about 20,000 fibers per bundle, compacted with the use of a sizing (U.S. Pat. No. 6,916,435).

As noted, the carbon fibers to be included in the blend are based on mesophase pitch or PAN. Mesophase pitch fibers are produced from pitch that has been at least partially transformed to a liquid crystal, or so-called mesophase, state. Mesophase pitch can be prepared from feedstocks such as heavy aromatic petroleum streams, ethylene cracker tars, coal derivatives, petroleum thermal tars, fluid cracker residues and pressure treated aromatic distillates having a boiling range from 340° C. to about 525° C. The production of mesophase pitch is described in, for example, U.S. Pat. No. 4,017,327 to Lewis et al. Typically, mesophase pitch is formed by heating the feedstock in a chemically inert atmosphere (such as nitrogen, argon, helium or the like) to a temperature of about 350° C. to 500° C. A chemically inert gas can be bubbled through the feedstock during heating to facilitate the formation of mesophase pitch. For preparation of carbon fibers, the mesophase pitch should have a softening point, that is, the point at which the mesophase pitch begins to deform, of less than about 400° C. and usually less than about 350° C. If the pitch has a higher softening point, formation of carbon fibers having the desired physical properties is difficult.

Once the mesophase pitch is prepared, it is spun into filaments of the desired diameter, by known processes such as by melt spinning, centrifugal spinning, blow spinning or other processes which will be familiar to the skilled artisan. Spinning produces carbon fibers suitable for use in preparing the electrode of the present invention. The filaments are then thermoset at a temperature no higher than the softening point of the pitch (but usually above 250° C.) for about 5 to 60 minutes, then further treated at extremely high temperatures, on the order of up to about 1000° C. and higher, and in some cases as high as about 3000° C., more typically about 1500° C. to 1700° C., to carbonize the fibers. The carbonization process takes place in an inert atmosphere, such as argon gas, for at least about 0.5 minutes. Most commonly, carbonization uses residence times of between about 1 and 25 minutes. The fibers are then cut to length and formed into bundles. Such fibers, bundled as described, are commercially available from, for instance, Cytec Industries Inc. of West Paterson, N.J. and Mitsubishi Chemical Functional Products Inc. of Tokyo, Japan.

One method of making the PAN fibers comprises spinning the fibers from a solution of polyacrylonitrile. The fibers are then stabilized in the same manner as are the mesophase pitch-based fibers. The production of PAN fibers is described, for instance, by Dan D. Edie and John J. McHugh in High Performance Carbon Fibers at pages 119-138 of Carbon Materials for Advanced Technologies, 1st Ed., Elsevier Science Ltd. 1999, the disclosure of which is incorporated herein by reference in its entirety.

The carbon fibers are preferably included in the stock blend at a level of about 0.5 to about 6 parts by weight of carbon fibers per 100 parts by weight of calcined coke. Most preferably, the fibers are present at a level of about 1.25 to about 6 parts by weight fibers per 100 parts by weight of coke. In terms of the blend as a whole (excluding binder), the carbon fibers are incorporated at a level of about 1% to about 5.5% by weight, more preferably about 1.5% to up to about 5.5%, even more preferably, about 5.0% or less.

After the blend of particulate fraction, pitch binder, carbon fibers, etc. is prepared, the body is formed (or shaped) by extrusion though a die or molded in conventional forming molds to form what is referred to as a green stock. The forming, whether through extrusion or molding, is conducted at a temperature close to the softening point of the pitch, usually about 100° C. or higher. Although the die or mold can form the article in substantially final form and size, machining of the finished article is usually needed, at the very least to provide structure such as threads. The size of the green stock can vary; for electrodes the diameter can vary between about 220 mm and 850 mm.

After extrusion, the green stock is heat treated by baking at a temperature of between about 700° C. and about 1100° C., more preferably between about 800° C. and about 1000° C., to carbonize the pitch binder to solid pitch coke, to give the article permanency of form, high mechanical strength, good thermal conductivity, and comparatively low electrical resistance, and thus form a carbonized stock. The green stock is baked in the relative absence of air to avoid oxidation. Baking should be carried out at a rate of about 1° C. to about 5° C. rise per hour to the final temperature. After baking, the carbonized stock may be impregnated one or more times with coal tar or petroleum pitch, or other types of pitches or resins known in the industry, to deposit additional coke in any open pores of the stock. Each impregnation is then followed by an additional baking step.

After baking, the carbonized stock is then graphitized. Graphitization is by heat treatment at a final temperature of between about 2500° C. to about 3400° C. for a time sufficient to cause the carbon atoms in the coke and pitch coke binder to transform from a poorly ordered state into the crystalline structure of graphite. Advantageously, graphitization is performed by maintaining the carbonized stock at a temperature of at least about 2700° C., and more advantageously at a temperature of between about 2700° C. and about 3200° C. At these high temperatures, elements other than carbon are volatilized and escape as vapors. The time required for maintenance at the graphitization temperature using the process of the present invention is no more than about 18 hours, indeed, no more than about 12 hours. Preferably, graphitization is for about 1.5 to about 8 hours.

As noted, once graphitization is completed; the finished article can be cut to size and then machined or otherwise formed into its final configuration. The finished article may be machined into a pin-socket electrode as illustrated in FIG. 1, depicted as 10. As shown, electrode 10 includes a main body (extending from end face to end face of electrode 10) 12, and pair of end faces 14 at each longitudinal end of body 12. A socket 16 may be machined into each end face 14, preferably socket 16 includes threads 18. Preferably main body 12 of electrode 10 has a length of more than 3050 mm (120 inches), more preferably 3300 mm (130 inches) or more, even more preferably 3550 mm (140 inches) or more, and most preferably 3680 mm (145 inches) or more. In one particular example, main body 12 has a length of greater than 3800 mm (about 150 inches). Due to the green stock losing some length during the graphitization and machining steps, electrode 10 is preferably formed from a green body having an electrode length of 3200 mm (126 inches) or more, more preferably 3430 mm (135 inches) or more, and even more preferably 3810 mm (150 inches) or more.

Figure 2:
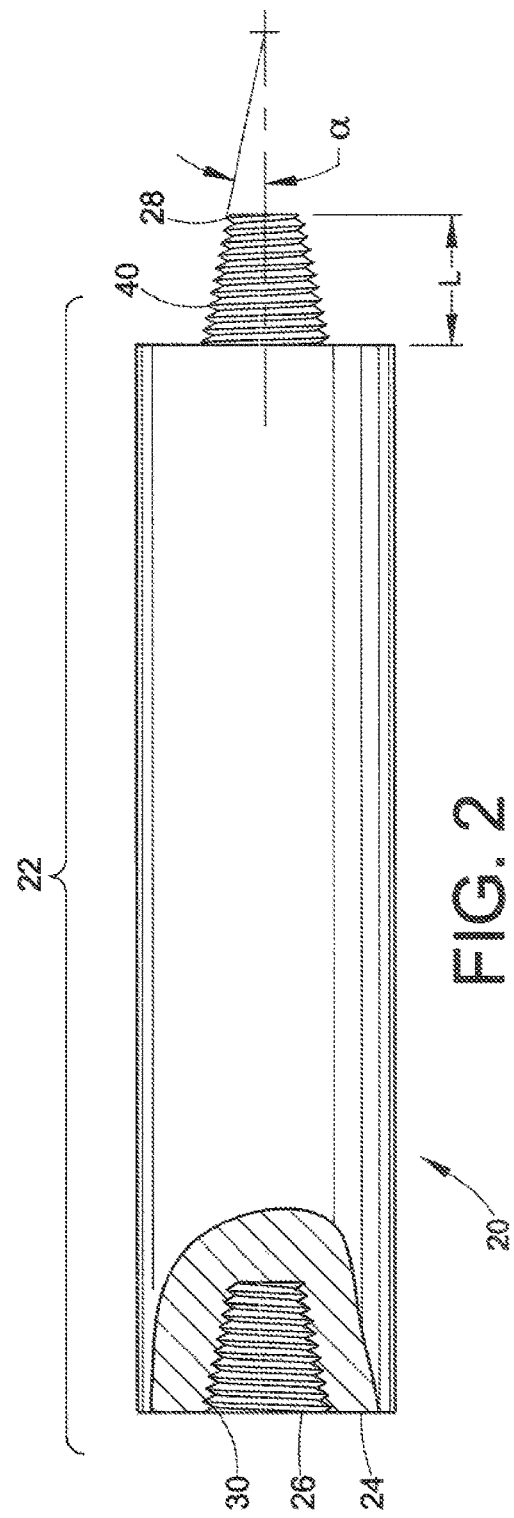
FIG. 2 is a view of a pinless joint electrode.
Figure 3:
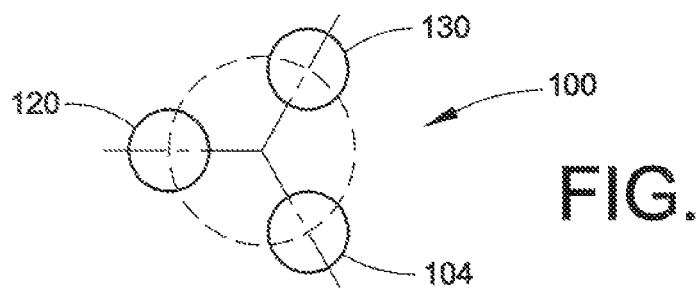
FIG. 3 is a top schematic view of furnace shown in FIG. 4.
Figure 4:
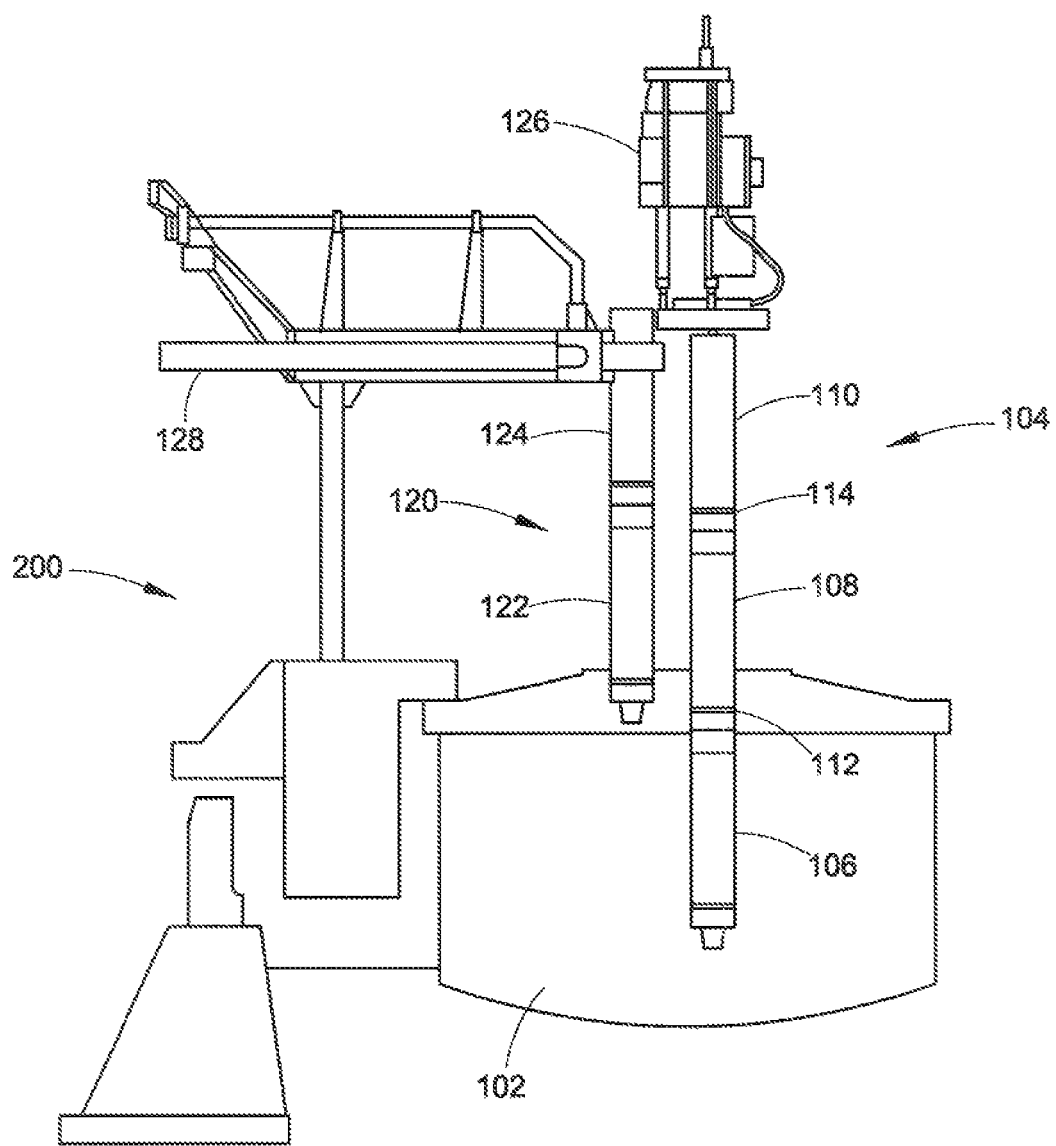
FIG. 4 is a front view of an electrode column on an electric arc furnace.

Shown in FIG. 2 is an electrode 20 which includes pinless joint technology. Electrode 20 also includes a main body (end face to end of tang) 22 and further includes a socket 26 in an end face 24 at one longitudinal end of body 22. Electrode 20 may also include a threaded tang 28 at or about a second longitudinal end of body 22. Body 22 of electrode 20 may have a length of at least 2920 mm (115 inches). In one particular embodiment, body 22 has a length of at least 3175 (125 inches), preferably at least 3300 mm (130 inches), more preferably at least 3425 mm (135 inches), and even more preferably at least 3550 mm (140 inches), and most preferably at least 3680 mm (145 inches). In one certain embodiment, the length of body 22 is at least about 3800 mm (about 150 inches). One way to measure the overall length of electrode 20 is from the exterior surface of end face 24 to the tip of tang 28. Examples of typical lengths of tang 28 are about 500 mm (20 inches) to about 630 mm (25 inches), measured from the tip of the tang to a base of the tang, illustrated by line "L" on FIG. 2. Preferably tang 28 extends from body 12 at a taper angle of "α." In one preferred embodiment, α is about 9° or greater. In another embodiment α is about 15° or greater. Optionally, electrode 20 may include a seal around tang 28, not shown.

The diameter of the above described electrodes 10 and 20 may vary as desired by the end user. The diameter of electrode 10 or 20 may vary from about 350 mm (14 inches) to about 860 mm (34 inches) as selected by the end user. Also the thread pitch in sockets 16 as well as socket 26 may vary as selected by the end user. The thread pitch or threads per inch (TPI) may vary from two (2) to eight (8) TPI for any socket of electrode 10 or 20. The threads 40 on tang 28 may have the same, or if desired different, pitch as the threads of socket 26. Similarly it is typical that both sockets 16 have the same TPI, however, if desired sockets 16 may have different TPI. The same is true for socket 26 and tang 28 in that typically socket 26 will have the same TPI as tang 28 or vice versa. However, the TPI may vary between socket 26 and tang 28 if desired by the end user.

Preferably, the above electrode may be included in the electrode column such that the column will include more than 3050 mm of length of monolithic electrode per joint between adjacent electrodes in the electrode column; more preferably, the length comprises more than 3300 mm. In one particular embodiment, the electrode column may comprise over 6300 mm and less than two joints between the electrodes, which make up the column.

An advantage of the disclosed embodiments is that they reduce the frequency of the occurrence of the joint in the electrode column, thus increasing the maximum length of electrode per joint. To the furnace operator, the disclosed subject matter will offer the advantage of increased yield of steel, less downtime per ton of steel reclaimed, and decreased labor requirements associated with electrode consumption per ton of steel reclaimed. For the electrode manufacturer, this is an opportunity to tailor electrodes to the specific requirements of individual steel manufacturers.

The various described embodiments may be practiced separately or in any combination thereof.

What is claimed is:

1. An electrode comprising a monolithic cylindrical main body having a first end and a second end and comprised substantially of a baked and graphitized extruded green stock, the first end includes a generally planar end face having a recessed threaded socket and the second end includes an axially extending threaded tapered tang, wherein a length of the electrode comprises more than 3050 mm.

2. The electrode of claim 1 wherein the length comprises more than about 3430 mm.

3. The electrode of claim 1 wherein the length comprises at least about 3680 mm.

4. The electrode of the claim 1 wherein a threads per inch of the tang comprises less than four (4) and a TPI of the socket comprises less than four (4).

5. The electrode of claim 1 wherein a taper of the tang comprises nine (9°) degrees or greater.

6. The electrode of claim 1 wherein a diameter of the main body comprises no more than about 860 mm.

7. The electrode of claim 1 wherein the electrode is a pinless joint electrode.

8. The electrode of claim 1 wherein the threaded socket and the threaded tapered tang have a similar thread pitch.

9. The electrode of claim 1 wherein the threaded socket and the threaded tapered tang have different thread pitches.

10. The electrode of claim 1 wherein the green stock has a diameter of less than 850 mm.

11. The electrode of claim 1 wherein the body has a length of 3050 mm to 3800 mm.

* * * * *